US008656013B2

(12) United States Patent
He (10) Patent No.: US 8,656,013 B2
(45) Date of Patent: Feb. 18, 2014

(54) REAL-TIME DATA MONITORING BASED ON DATA PUSH

(75) Inventor: Shawn He, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 97 days.

(21) Appl. No.: 13/160,348

(22) Filed: Jun. 14, 2011

(65) Prior Publication Data

US 2012/0324093 A1    Dec. 20, 2012

(51) Int. Cl.
*G06F 15/173*    (2006.01)
*G06F 15/16*    (2006.01)

(52) U.S. Cl.
USPC ............ 709/224; 709/203; 709/227; 709/237

(58) Field of Classification Search
USPC .......................................................... 709/224
See application file for complete search history.

(56) References Cited

U.S. PATENT DOCUMENTS

| | | | | |
|---|---|---|---|---|
| 6,950,868 | B1* | 9/2005 | Faraldo, II | 709/224 |
| 7,243,143 | B1* | 7/2007 | Bullard | 709/223 |
| 7,594,009 | B2* | 9/2009 | Triulzi et al. | 709/224 |
| 7,814,470 | B2* | 10/2010 | Mamou et al. | 717/162 |
| 8,108,508 | B1* | 1/2012 | Goh et al. | 709/224 |
| 8,301,766 | B2* | 10/2012 | Clubb et al. | 709/224 |
| 8,341,270 | B2* | 12/2012 | Mazzaferri et al. | 709/227 |
| 8,351,898 | B2* | 1/2013 | Raleigh | 455/405 |
| 2005/0027858 | A1* | 2/2005 | Sloth et al. | 709/224 |
| 2006/0291657 | A1* | 12/2006 | Benson et al. | 380/270 |
| 2010/0138534 | A1* | 6/2010 | Mutnuru et al. | 709/224 |
| 2011/0164533 | A1* | 7/2011 | Krumel | 370/255 |
| 2012/0079105 | A1* | 3/2012 | Hoffman | 709/224 |
| 2012/0254286 | A1* | 10/2012 | Harlow | 709/202 |
| 2012/0276867 | A1* | 11/2012 | McNamee et al. | 455/406 |
| 2012/0278464 | A1* | 11/2012 | Lehane et al. | 709/223 |
| 2012/0278477 | A1* | 11/2012 | Terrell et al. | 709/224 |
| 2012/0304130 | A1* | 11/2012 | Rueff et al. | 715/850 |
| 2012/0311706 | A1* | 12/2012 | Newman | 726/22 |

OTHER PUBLICATIONS

Freed, N. and Kille, S. "Network Services Monitoring MIB," RFC 2788, Mar. 2000.*
Siddiqui, A. et al. "Transport Mappings for Real-Time Application Quality of Service Monitoring (RAQMON) Protocol Data Unit (PDU)," RFC 4712, Oct. 2006.*
Sheffer, Y. and Tschofenig, H. "Internet Key Exchange Protocol Version 2 (IKEv2) Session Resumption," RFC 5723, Jan. 2010.*
Bagnulo, M. et al. "Stateful NAT64: Network Address and Protocol Translation from IPv6 Clients to IPv4 Servers," RFC 6146, Apr. 2011.*

(Continued)

*Primary Examiner* — Melvin H Pollack
(74) *Attorney, Agent, or Firm* — Procopio, Cory, Hargreaves & Savitch, LLP (57) ABSTRACT

Data monitoring including: establishing a real-time connection between at least two processing entities; defining transfer preferences for data and metrics to be sent for monitoring; and sending the data and metrics from at least one sending entity to a collecting entity of the at least two processing entities using a data push process, wherein the data push process is based on the transfer preferences defined in advance for the data and metrics.

16 Claims, 5 Drawing Sheets

(56) References Cited

OTHER PUBLICATIONS

"SODA—The Intelligent Complete System for Data Acquisition and Distribution," KISTERS Pioneering Technologies, 2011.*

Liljenstam, M. et al. "RINSE: The Real-Time Immersive Network Simulation Environment for Network Security Exercises," Workshop on Principles of Advanced and Distributed Simulation (PADS), Jun. 3, 2005, pp. 119-128.*

Cranor, Chuck et al. "Gigascope: High Performance Network Monitoring with an SQL Interface," Proceedings of the 2002 ACM SIGMOD International Conference on Management of Data, 2002, p. 623.*

Harrison, Timothy H. et al. "THe Design and Performance of a Real-Time CORBA Event Service," Proceedings of the 12$^{th}$ ACM SIGPLAN Conference on Object-Oriented Programming, Systems, Languages and Applications, vol. 32, Issue 10, Oct. 1997, pp. 184-200.*

* cited by examiner

REAL-TIME DATA MONITORING BASED ON DATA PUSH

BACKGROUND

1. Field of the Invention

The present application relates to real-time data monitoring, and more specifically, to real-time data monitoring based on data push.

2. Background

Components of a computer network can be monitored and a notification can be sent to the network administrator in case of outages. A network monitoring system can monitor the network for problems caused by overloaded/crashed connections, servers, or network devices. For example, an HTTP request to fetch a page may be sent periodically to determine the status of a server. Commonly measured metrics are response time, availability, and uptime.

SUMMARY

Implementations of the present application provide for real-time data monitoring.

In one implementation, a method of data monitoring is disclosed. The method includes: establishing a real-time connection between at least two processing entities; defining transfer preferences for data and metrics to be sent for monitoring; and sending the data and metrics from at least one sending entity to a collecting entity of the at least two processing entities using a data push process, wherein the data push process is based on the transfer preferences defined in advance for the data and metrics.

In another implementation, a system to monitor network data is disclosed. The system includes: at least one sending entity; a collecting entity configured to establish a real-time connection with the at least one sending entity and define transfer preferences for data and metrics to be sent from the at least one sending entity to the collecting entity for monitoring, wherein the data and metrics are sent from the at least one sending entity to the collecting entity using a data push process, wherein the data push process is a process of transferring data from the at least one sending entity to the collecting entity based on the transfer preferences defined in advance for the data and metrics.

In a further implement, a non-transitory computer-readable storage medium storing a computer program, the computer program including executable instructions that cause a computer to perform real-time data monitoring is disclosed. The computer program includes executable instructions that cause a computer to: establish a real-time connection between at least two processing entities; define transfer preferences for data and metrics to be sent for monitoring; and send the data and metrics from at least one sending entity to a collecting entity of the at least two processing entities using a data push process, wherein the data push process is based on the transfer preferences defined in advance for the data and metrics.

Other features and advantages of the present application will become more readily apparent to those of ordinary skill in the art after reviewing the following detailed description and accompanying drawings.

DETAILED DESCRIPTION

Certain implementations as disclosed herein provide for real-time data monitoring based on data push. The concept of data push is based on defining or expressing data transfer preferences and/or formats in advance between two entities in which the data is to be transferred. In one implementation, the preferences and/or formats are defined or expressed in a handshaking procedure performed between the two entities. After reading this description it will become apparent how to implement the present application in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present application.

Figure 1A:
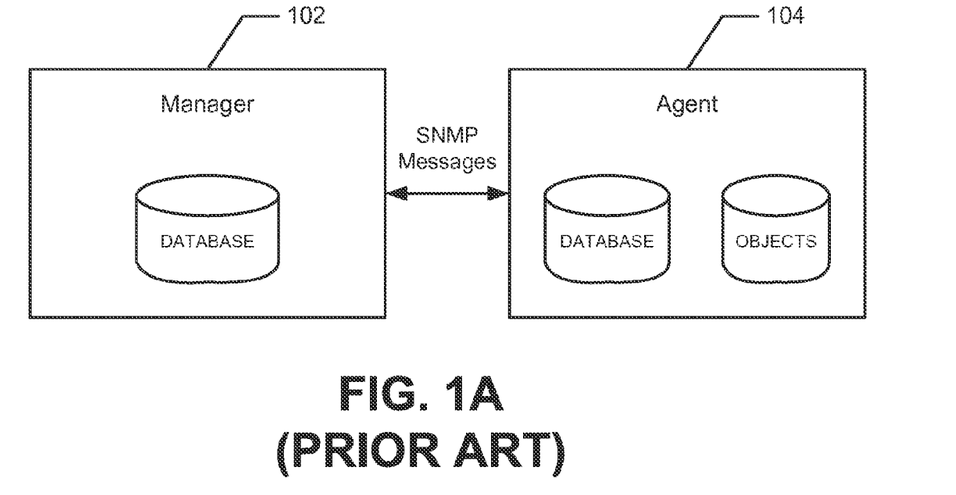
FIG. 1A illustrates a manager communicating with an agent using a number of SNMP messages.
Figure 1B:
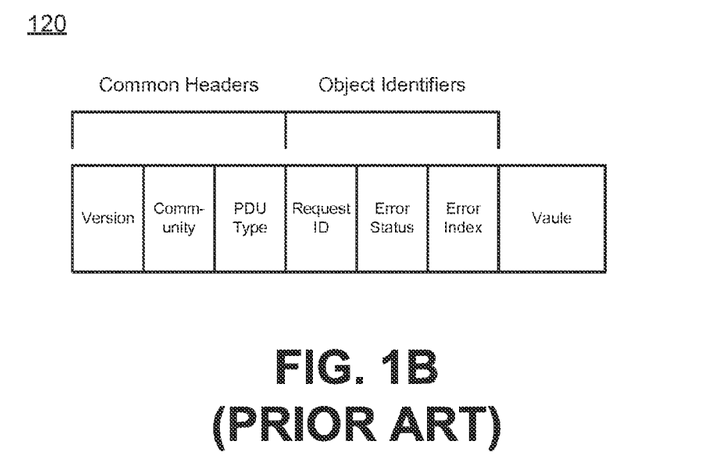
FIG. 1B shows one example of an SNMP message packet.

Simple Network Management Protocol (SNMP) is a typical protocol for managing devices on IP networks. Devices that typically support SNMP include servers, routers, switches, printers, modems, etc. It is used mostly in network management systems to monitor network-attached devices for conditions that warrant administrative attention. SNMP exposes management data in the form of data variables on the managed systems, which describe the system configuration. These variables can then be queried by managing applications using data polling. For example, FIG. 1A shows a manager 102 communicating with an agent 104 using a number of SNMP messages. Thus, the illustrated figure shows one example configuration of SNMP based on the manager/agent model 100 including the manager 102, the agent 104, database of management information, managed objects and the network protocol. FIG. 1B shows one example of the SNMP message packet 120.

The SNMP message packet format 120 includes common SNMP headers such as version, community, and protocol data unit (PDU) type, as well as object identifier headers such as request ID, error status, and error index. In one example, each SNMP request message includes 24 bytes of common header fields, 14 bytes of object identifiers, and 4 bytes of value for a total of 42 bytes. Thus, in SNMP, a typical application server which uses between 1400 and 14000 messages, uses the bandwidth of more than 58.8 to 588 Kilobytes, in addition to the CPU processing for the 1400 to 14000 messages. Accordingly, it can be seen that typical protocols that use data polling such as SNMP require high overhead and bandwidth.

Figure 2:
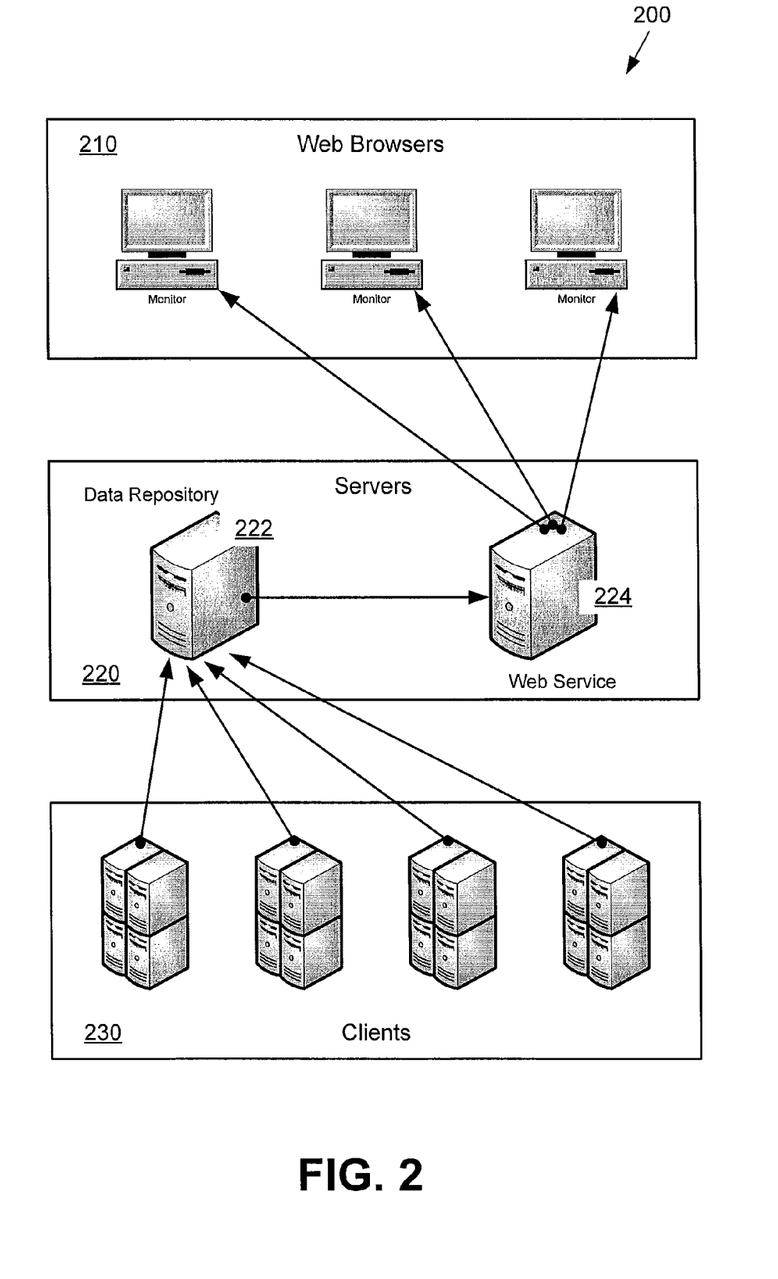
FIG. 2 is a real-time data monitoring system which is based on data push in accordance with one implementation of the present invention.

FIG. 2 is a data monitoring system 200 based on data push in accordance with one implementation of the present invention. In the illustrated implementation of FIG. 2, the data monitoring system 200 is configured as a proprietary system called Simple Online Data Acquisition (SODA). The illustrated system 200 is a real-time tool configured to collect and monitor data and application metrics, and includes servers 220, clients 230, and web browsers 210. In one implementation, the clients 230 can be configured as local application servers/terminals. Servers 220 include a data repository 222 and a web service 224. In the real-time data monitoring system 200, the servers 220 and clients 230 negotiate a real-time, stateful connection by using a handshaking procedure. Thus, in a stateful connection, some information about a connection is retained and the connection is kept open even when the entities such as servers and clients are not transmitting information. During the handshaking procedure, the servers 220 and clients 230 negotiate which parameters to use to establish the real-time connection.

Figure 3:
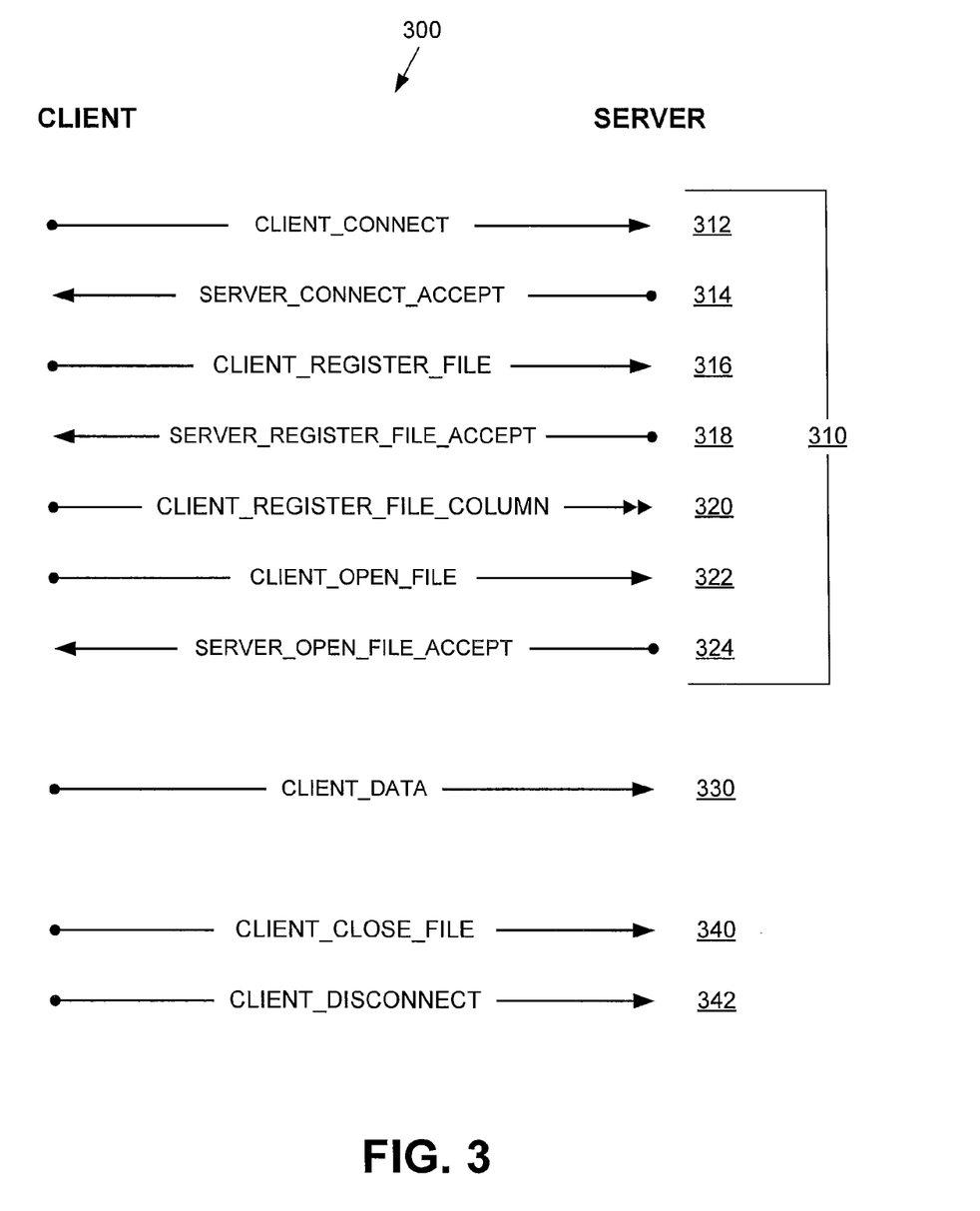
FIG. 3 is a sequence of data exchanges including a handshake used in the real-time data monitoring system in accordance with one implementation of the present invention.

FIG. 3 shows a sequence of data exchanges 300 including a handshake 310 used in the real-time data monitoring system 200 in accordance with one implementation of the present invention. The handshake 310 establishes the sequence and allows the client to define any data the client wants to send to the server for real-time monitoring of data. In the illustrated implementation, the handshake 310 begins when a client requests to connect to a server 312. Mutual authentication is performed during the session establishment. The server then sends back a "connect accept" signal 314 to the client. The client also sends a register file 316 to the server which authenticates the client and returns a response message 318 if authentication is a success. The client then sends register file columns 320 and an open file request 322. The server then sends an "open file accept" signal 324 to complete the handshake 310. This establishes the real-time connection between the client and the server and allows the client to use periodic data push to send data and application metrics (in process 330) to the server for real-time data monitoring. The real-time monitoring sequence can be terminated by the client when it sends a close file signal 340 and disconnects itself from the server (in process 342).

As discussed above, data and application metrics are monitored by the server as the client is sending the data and metrics using periodic data push 330. In one example, in which the client is a game application, the client can send a multitude of variables used in the game for monitoring using periodic data push. In this situation, the transmission of the multitude of game variables is made possible because the system uses data push rather than data polling which requires high overhead and bandwidth. Using periodic data push rather than a periodic data polling mechanism provides big savings in overhead, and in turn, in bandwidth, due to the elimination of packet headers for each data point. This is especially useful for bandwidth-sensitive time-critical application, such as online games, to monitor its detail behavior in real-time.

In one implementation of the real-time data monitoring system 200, an application metrics collecting and monitoring tool uses data push to provide several advantages over data polling. For example, the tool enables a user to add new metrics dynamically without affecting other parts of the system. Thus, a restart of the changed component (title server plug-in or title client) is sufficient. In contrast, in a data polling system, the server needs to know ahead of time what kind of data to collect. Also, due to the modular structure of the system, the user is able to switch to use other data storage format (databases) or presentation format (web pages) with minimum effort. Thus, the user can use any third party data analysis tool. Further, the system provides ubiquitous interface because the user is able to view the monitored metrics in real-time using web browsers 210.

In one implementation, the message packet format for the real-time data monitoring system 200 includes one byte for the message type, two bytes for the message length, one byte for the file index, four bytes for the time stamp, and four-n bytes for the data, where n refers to the count of monitored metrics. Thus, in the real-time data monitoring system 200 (such as SODA), a message can monitor n number of metrics. In contrast, in conventional systems including SNMP, each message only monitors one metric. Therefore, it can be seen that the conventional system like SNMP uses a substantial amount of overhead for each message.

The real-time data monitoring system 200 can be used in the development phase of an application because it is helpful in debugging and fine-tuning of the application, in both title specific plug-ins and clients. In production phase of an application, the system 200 is helpful for application specific performance monitoring and troubleshooting.

Figure 4:
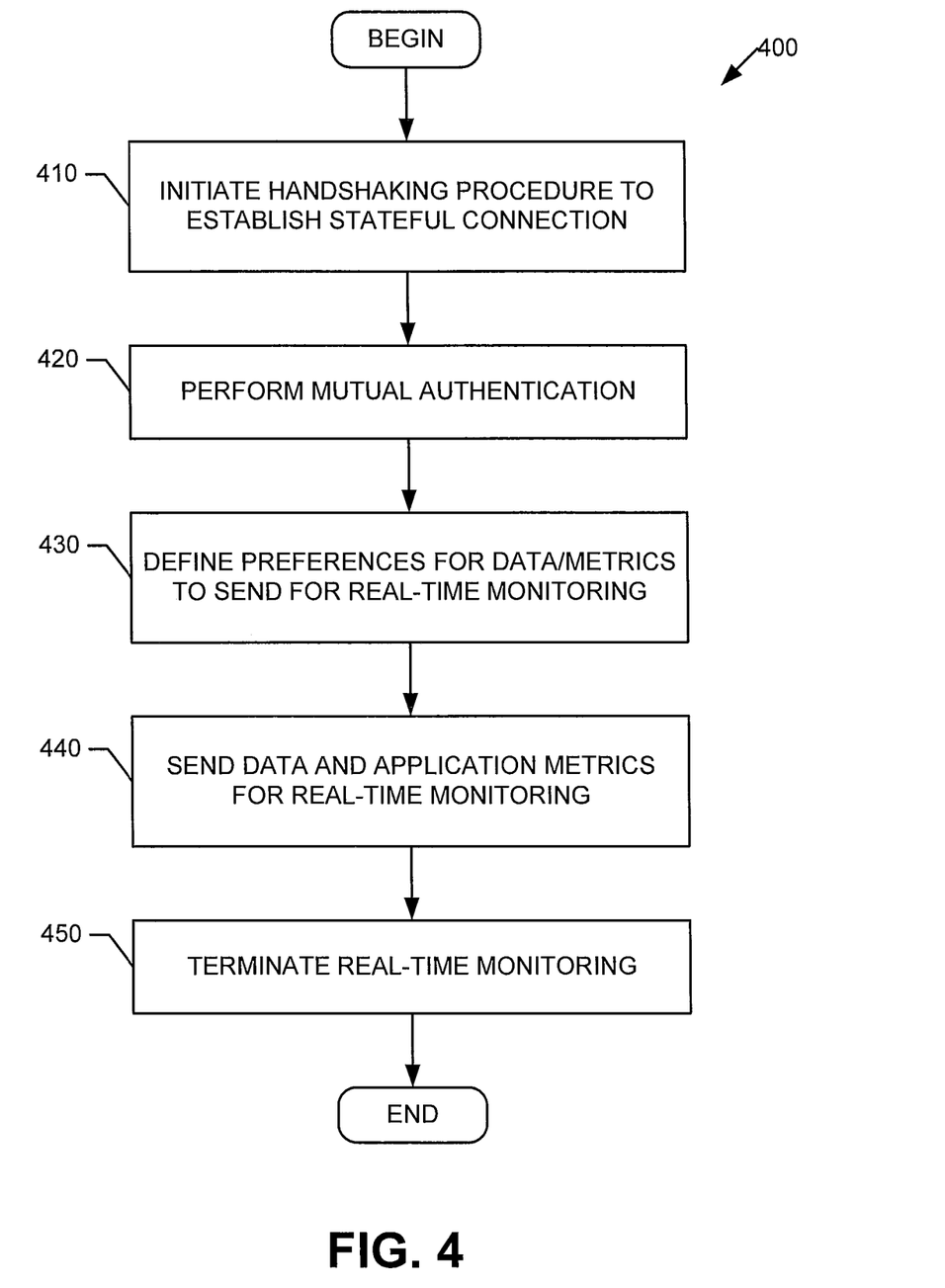
FIG. 4 is a flowchart illustrating a real-time data monitoring process in accordance with one implementation of the present application.

FIG. 4 is a flowchart illustrating a real-time data monitoring process 400 in accordance with one implementation of the present application. In the illustrated implementation of FIG. 4, the real-time data monitoring process 400 is based on data push configured to collect and monitor data and application metrics. The process 400 involves initiating a handshaking procedure, box 410, by enabling the servers and clients to negotiate a real-time, stateful connection. In one implementation, the connection is established between at least two processing entities such as servers and clients. In another implementation, the connection is established between a manager and an agent. In yet another implementation, the connection is established between a collector and an application. During the handshaking procedure, the servers and clients negotiate which parameters to use to establish the connection. Mutual authentication is performed during the session establishment, at box 420. At box 430, transfer preferences for data and metrics to send for real-time monitoring are defined. This establishes the connection between the client and the server and allows the client to use a periodic data push process to send data and application metrics to the server for real-time network monitoring, at box 440. Again, the data push process is based on the transfer preferences defined in advance for the data and metrics. The real-time network monitoring sequence can be terminated, at box 450, by the client when it sends a close file signal 340 and disconnects itself from the server.

Figure 5A:
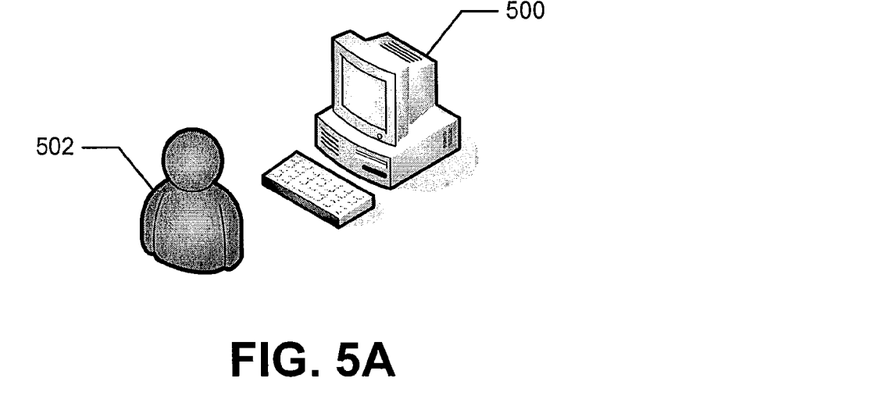
FIG. 5A illustrates a representation of a computer system and a user.

FIG. 5A illustrates a representation of a computer system 500 and a user 502. The user 502 uses the computer system 500 to perform a real-time data monitoring process. The computer system 500 stores and executes a real-time data monitoring process 590.

Figure 5B:
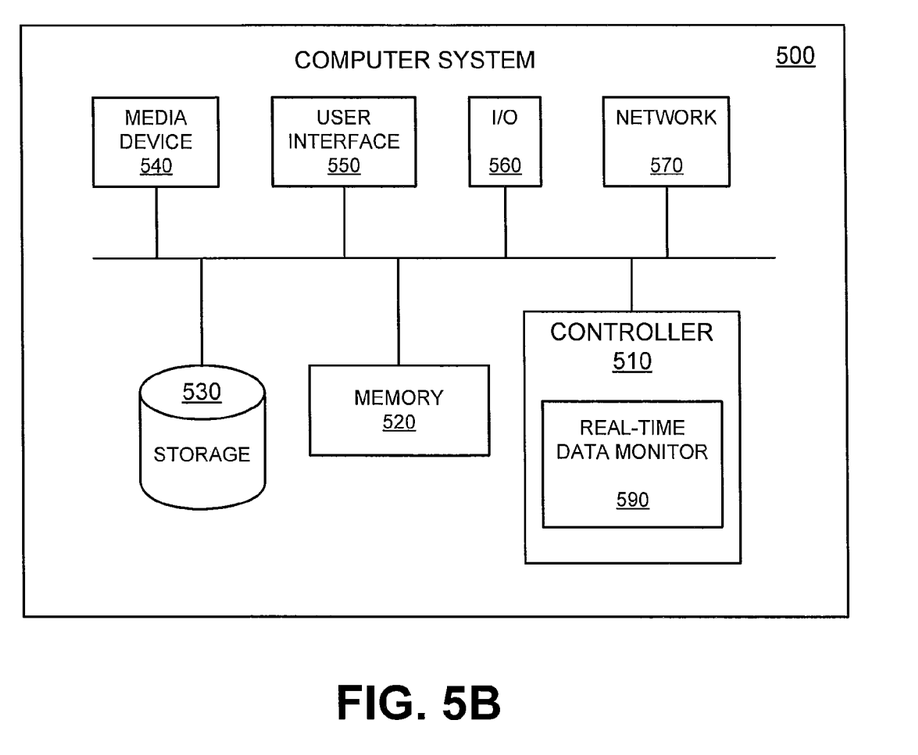
FIG. 5B is a functional block diagram illustrating the computer system hosting a real-time data monitoring process.

FIG. 5B is a functional block diagram illustrating the computer system 500 hosting the real-time data monitoring process 590. The controller 510 is a programmable processor and controls the operation of the computer system 500 and its components. The controller 510 loads instructions (e.g., in the form of a computer program) from the memory 520 or an embedded controller memory (not shown) and executes these instructions to control the system. In its execution, the controller 510 provides the real-time data monitoring process 590 as a software system. Alternatively, this service can be implemented as separate hardware components in the controller 510 or the computer system 500.

Memory 520 stores data temporarily for use by the other components of the computer system 500. In one implementation, memory 520 is implemented as RAM. In another implementation, memory 520 also includes long-term or permanent memory, such as flash memory and/or ROM.

Storage 530 stores data temporarily or long term for use by other components of the computer system 500, such as for storing data used by the real-time data monitor 590. In one implementation, storage 530 is a hard disk drive.

The media device 540 receives removable media and reads and/or writes data to the inserted media. In one implementation, for example, the media device 540 is an optical disc drive.

The user interface 550 includes components for accepting user input from the user of the computer system 500 and presenting information to the user. In one implementation, the user interface 550 includes a keyboard, a mouse, audio speakers, and a display. The controller 510 uses input from the user to adjust the operation of the computer system 500.

The I/O interface 560 includes one or more I/O ports to connect to corresponding I/O devices, such as external storage or supplemental devices (e.g., a printer or a PDA). In one implementation, the ports of the I/O interface 560 include ports such as: USB ports, PCMCIA ports, serial ports, and/or parallel ports. In another implementation, the I/O interface 560 includes a wireless interface for communication with external devices wirelessly.

The network interface 570 includes a wired and/or wireless network connection, such as an RJ-45 or "Wi-Fi" interface (including, but not limited to 802.11) supporting an Ethernet connection.

The computer system 500 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the illustrated implementations discuss monitoring of data and application metrics. However, in other implementations, other parameters such as graphical items/icons and signals can also be monitored. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

All features of each above-discussed example are not necessarily required in a particular implementation of the present application. Further, it is to be understood that the description and drawings presented herein are representative of the subject matter which is broadly contemplated by the present application. It is further understood that the scope of the present application fully encompasses other implementations that may become obvious to those skilled in the art and that the scope of the present application is accordingly limited by nothing other than the appended claims.

The invention claimed is:

1. A data monitoring method, comprising:
   establishing a real-time connection between at least two processing entities comprising at least one sending entity and a monitoring entity;
   defining transfer preferences for data and metrics to be sent for the data monitoring after the real-time connection between the at least two processing entities has been established,
   wherein the transfer preferences require periodic data push by the at least one sending entity; and
   sending the data and metrics from the at least one sending entity to the monitoring entity using the periodic data push.

2. The method of claim 1, further comprising
   performing mutual authentication between the at least one sending entity and the monitoring entity.

3. The method of claim 1, wherein the at least one sending entity comprises at least one client.

4. The method of claim 3, wherein the at least one client comprises at least one local application server.

5. The method of claim 1, wherein the monitoring entity comprises a server.

6. The method of claim 5, wherein the server comprises a data repository.

7. The method of claim 1, wherein establishing a real-time connection between at least two processing entities comprises
   initiating a handshaking procedure to enable servers and clients to negotiate a stateful connection.

8. The method of claim 1, wherein defining transfer preferences for data and metrics to be sent for monitoring comprises
   negotiating which parameters to use to establish the connection between the at least two processing entities.

9. A data monitoring system, comprising:
   at least one sending entity;
   a monitoring entity configured to establish a real-time connection with the at least one sending entity and define transfer preferences for data and metrics to be sent from the at least one sending entity to the monitoring entity for monitoring,
   wherein the data and metrics are sent from the at least one sending entity to the monitoring entity using a data push process,
   wherein the transfer preferences require periodic data push by the at least one sending entity to the monitoring entity defined in advance for the data and metrics.

10. The system of claim 9, wherein the at least one sending entity comprises at least one client.

11. The system of claim 10, wherein the at least one client comprises at least one local application server.

12. The system of claim 9, wherein the monitoring entity comprises a server.

13. The system of claim 12, wherein the server comprises a data repository.

14. A non-transitory computer-readable storage medium storing a computer program, the computer program comprising executable instructions that cause a computer to perform data monitoring, the computer program comprising executable instructions that cause a computer to:

establish a real-time connection between at least two processing entities comprising at least one sending entity and a monitoring entity;

define transfer preferences for data and metrics to be sent for the data monitoring after the real-time connection between the at least two processing entities has been established, wherein the transfer preferences require periodic data push by the at least one sending entity; and send the data and metrics from the at least one sending entity to the monitoring entity using the periodic data push.

15. The storage medium of claim 14, wherein executable instructions that cause a computer to establish a real-time connection between at least two processing entities comprise executable instructions that cause a computer to initiate a handshaking procedure to enable servers and clients to negotiate a stateful connection.

16. The storage medium of claim 14, wherein executable instructions that cause a computer to define preferences for data and metrics to be sent for monitoring comprise executable instructions that cause a computer to negotiate which parameters to use to establish the connection between the at least two processing entities.

* * * * *